F. H. MAYOH.
MILLING MACHINE CONSTRUCTION.
APPLICATION FILED OCT. 16, 1920.
1,437,902.
Patented Dec. 5, 1922.
7 SHEETS—SHEET 1.
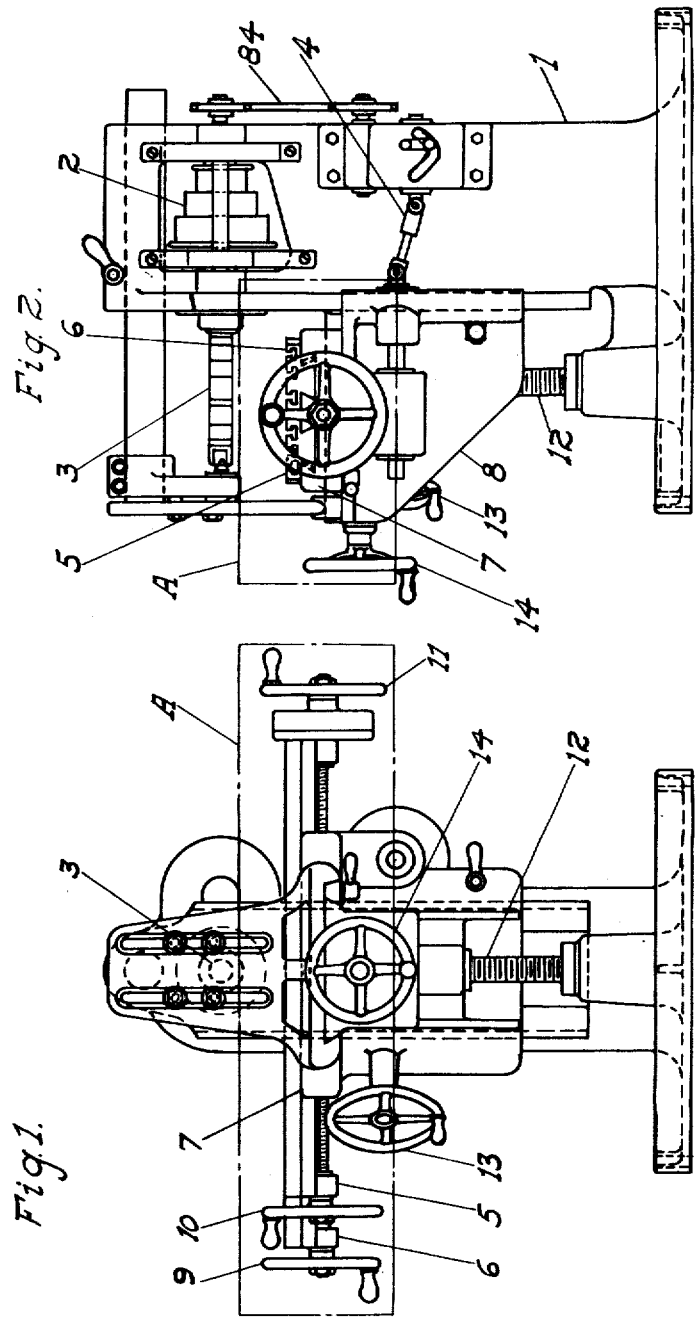
Witnesses:
William A. Ferguson
Wendell G. Ingham
Inventor:
Frank H. Mayoh.

F. H. MAYOH.
MILLING MACHINE CONSTRUCTION.
APPLICATION FILED OCT. 16, 1920.
1,437,902.
Patented Dec. 5, 1922.
7 SHEETS—SHEET 2.
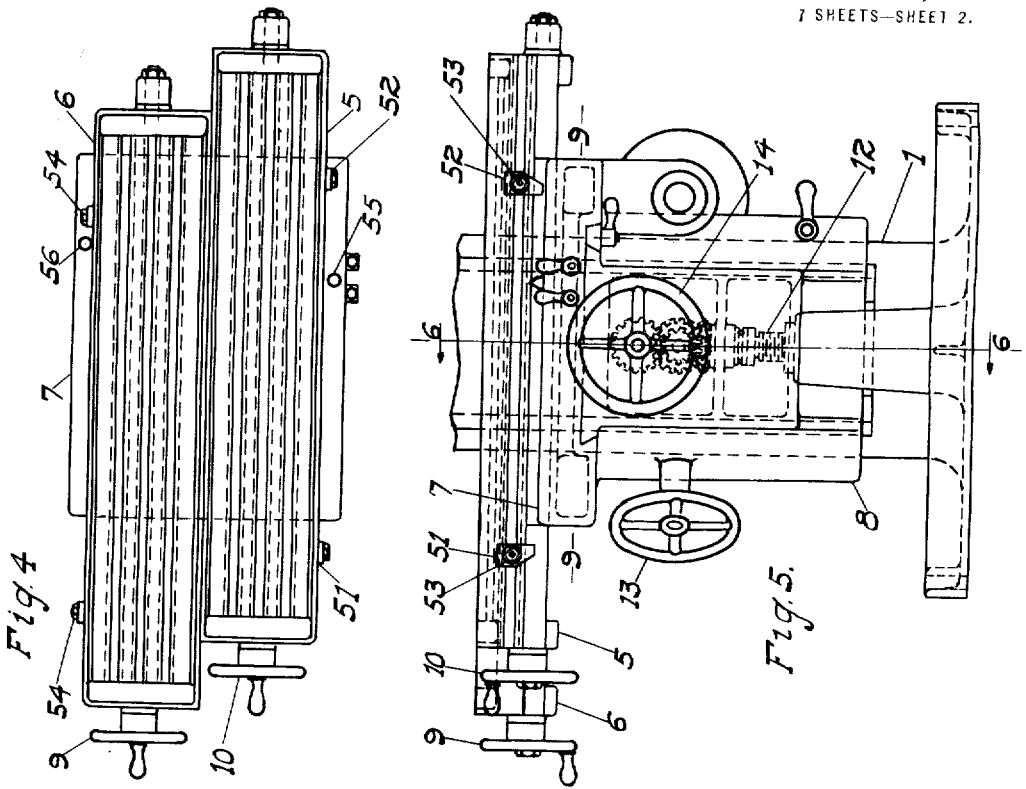
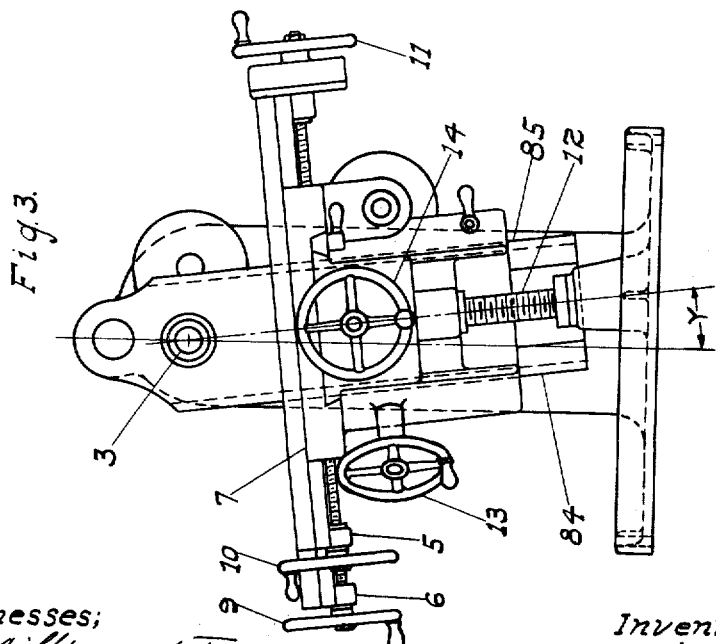
Witnesses;
William A. Ferguson
Wendell T. Ingham
Inventor;
Frank H. Mayoh.

F. H. MAYOH.
MILLING MACHINE CONSTRUCTION.
APPLICATION FILED OCT. 16, 1920.
1,437,902.
Patented Dec. 5, 1922.
7 SHEETS—SHEET 3.
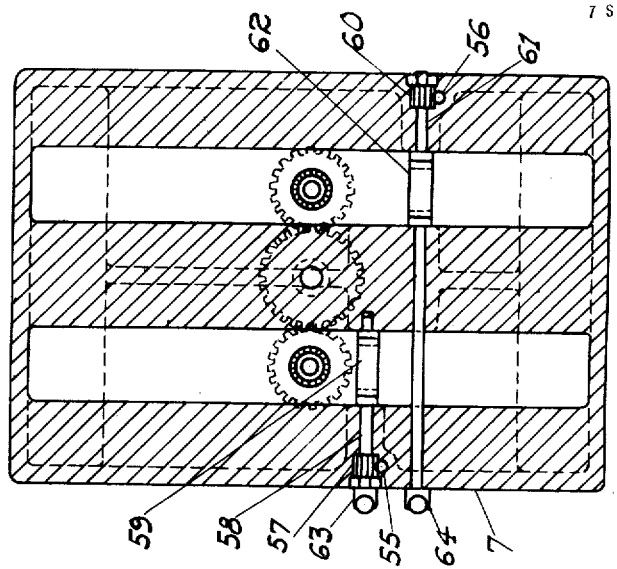
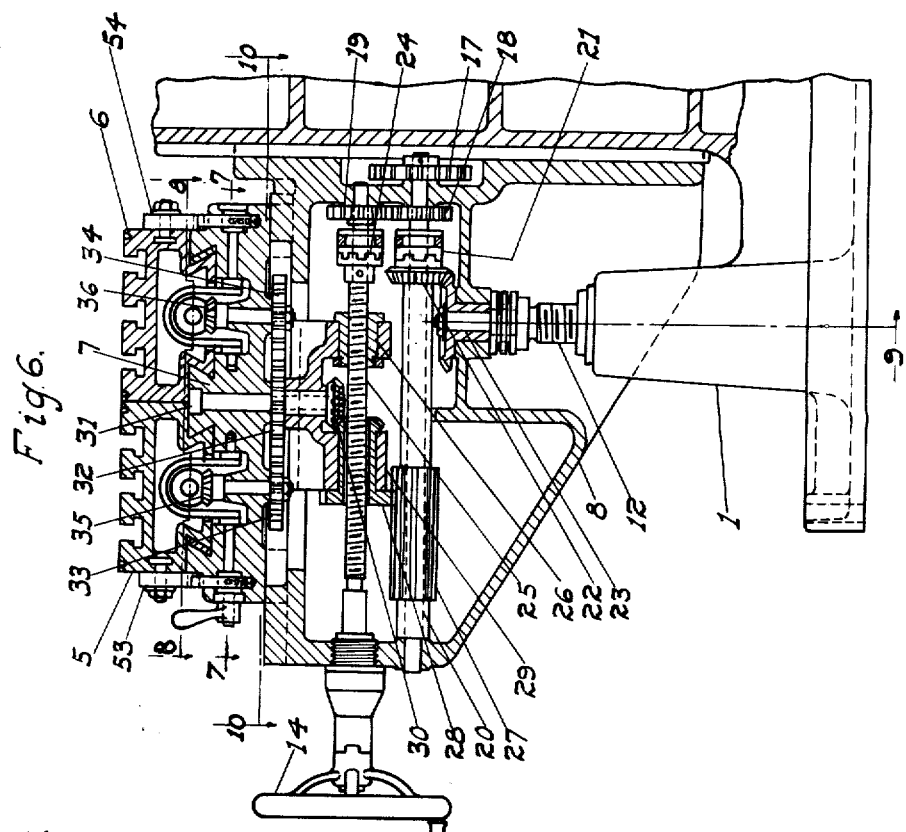
Witnesses:
William A. Ferguson
Wendell T. Ingham
Inventor;
Frank H. Mayoh.

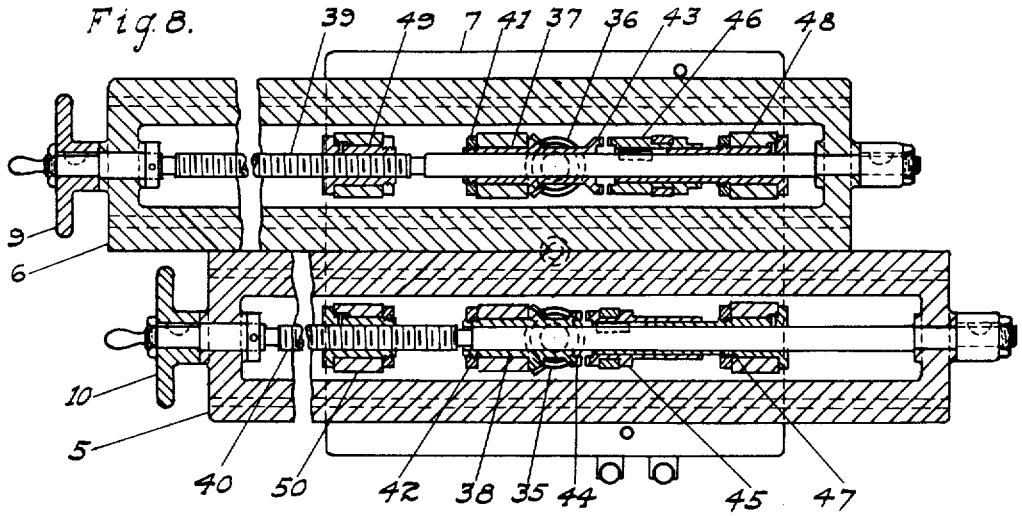
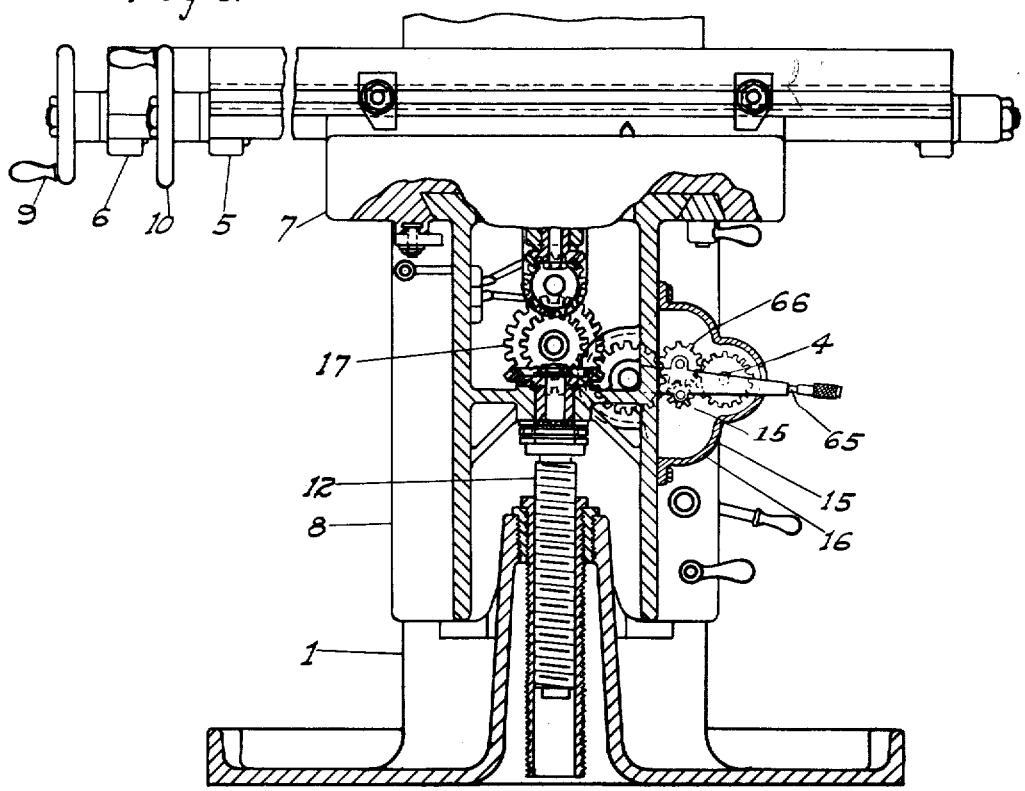

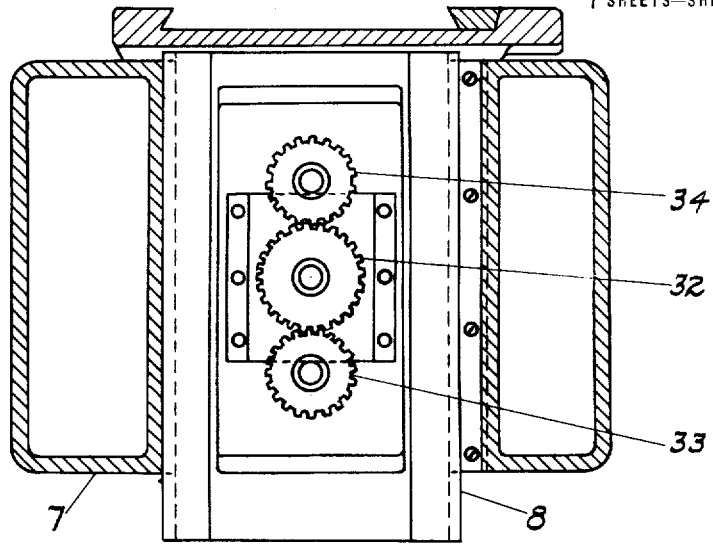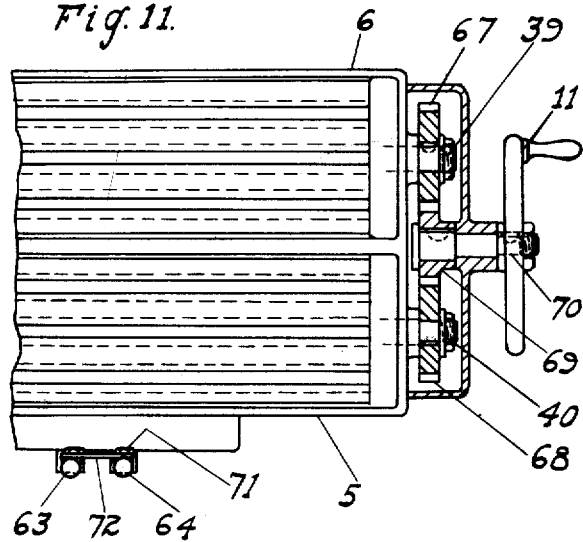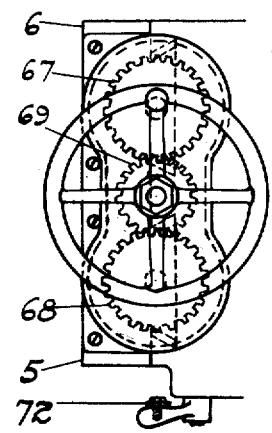

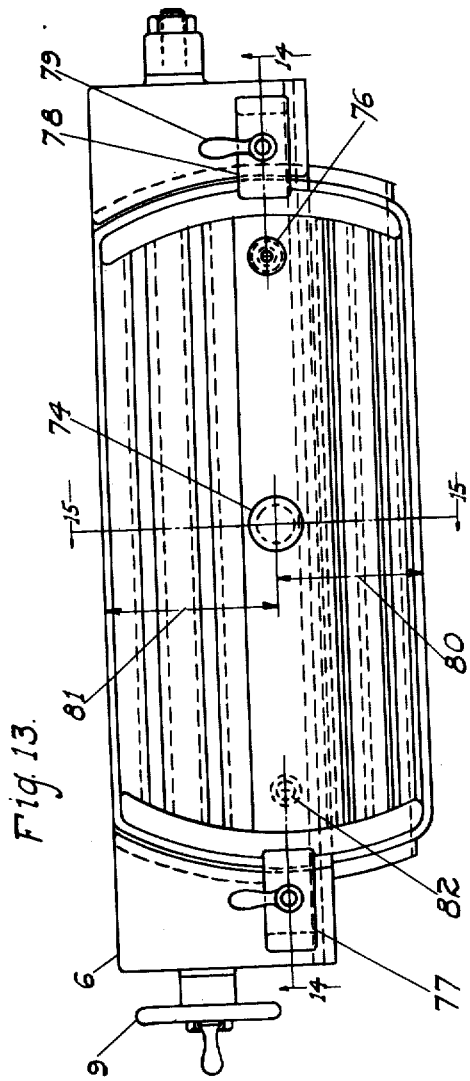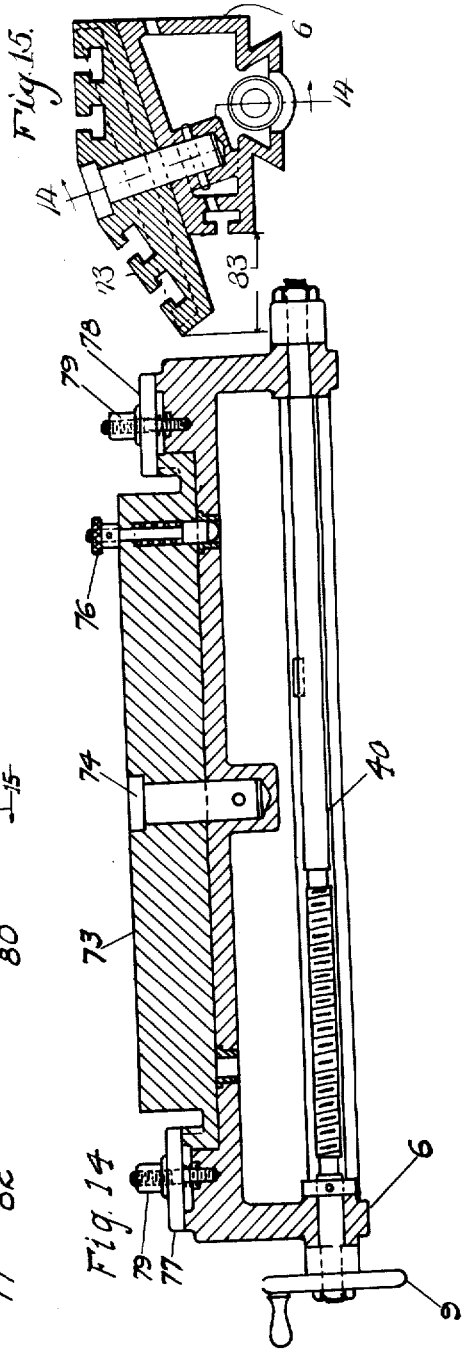

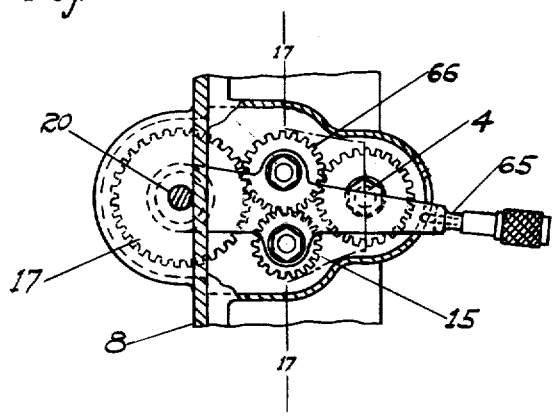
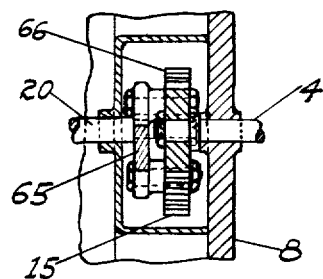
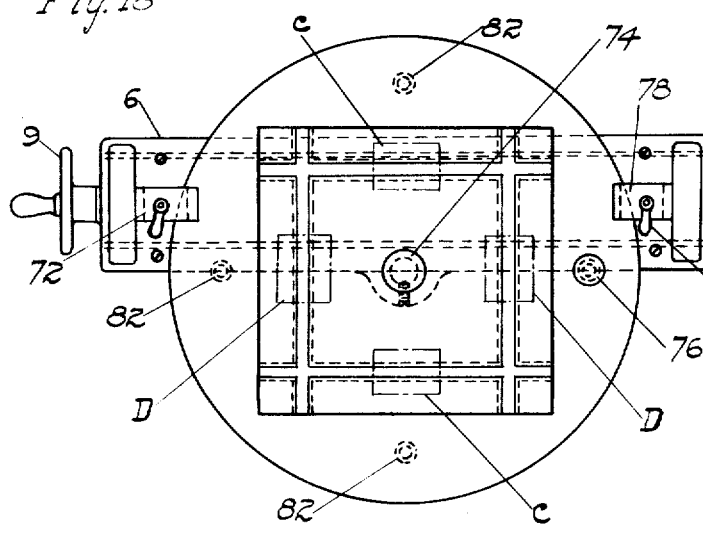
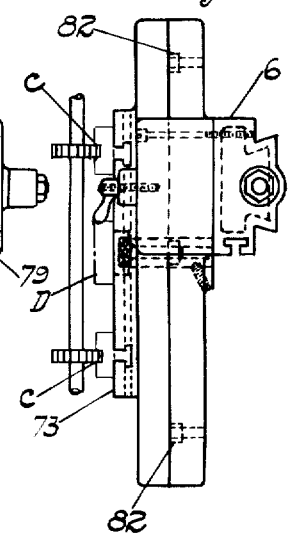

Patented Dec. 5, 1922.

1,437,902

UNITED STATES PATENT OFFICE.

FRANK H. MAYOH, OF HOLYOKE, MASSACHUSETTS.

MILLING-MACHINE CONSTRUCTION.

Application filed October 16, 1920. Serial No. 417,369.

*To all whom it may concern:*

Be it known that I, FRANK H. MAYOH, a citizen of the United States, residing at Holyoke, in the county of Hampden and State of Massachusetts, have invented certain new and useful Improvements in Milling-Machine Construction; and I do hereby declare the following to be a full, clear, and exact description of the invention, such as will enable others skilled in the art to which it appertains to make and use the same.

My invention relates to milling machine construction and means of operation.

The object of the invention is the production of a milling machine of novel and improved construction whereby a machine for milling with a rotating cutter surfaces on brackets, plates, shafts and similar articles, such as are now on the market and with which operators have become familiar may be equipped with tables which assist an operator to multiply its productive output; it is also arranged to better withstand the stress of driving the tables under the milling cutters. It provides for suitable mechanism for operating the work tables without complicated adjustment thereby accomplishing better results than in machines now in general use. It is applicable whether the milling cutter is held in a horizontal or a vertical plane in a so-called "horizontal milling machine" or a "vertical milling machine."

To these ends the invention consists of the features of construction and combinations of parts hereinafter described and referred to in the claims, the advantages of which will be apparent to those skilled in the art from the following detailed description of the machine in which the preferred forms of the invention have been embodied.

In the drawings which are shown on seven sheets, Figure 1 is a front elevation on a reduced scale of one type of milling machine, with the two tables mounted in place, in its preferred form the portion of the machine embodying this feature being enclosed by dot and dash lines A. Fig. 2 is a side elevation of the same machine; these two views clearly show how power may be transmitted from the machine to the tables, this driving means being similar to some now in use for operating one table and with which operators are generally familiar. Fig. 3 represents an improvement in the arrangement of the tables and supporting members with relation to the milling cutters and the supporting column of the machine, the tables being set at right angles to angle Y, this view being otherwise similar to Fig. 1. Fig. 4 is a plan view of the two tables. Fig. 5 is a front elevation of the two tables with supporting and driving mechanism. Fig. 6 represents a section through the two tables mounted on supporting and driving mechanism the cutting plane being on line 6—6 through Figure 5. Fig. 7 represents a plan section through the saddle of the milling machine to show clearly the feed control shafts the cutting plane being on line 7—7 through Figure 6. Fig. 8 represents a plan section of the two tables to show the table feed screws the cutting plane being on line 8—8 through Figure 6. Fig. 9 is a partial front view and partial front sectional view of the two tables with support and drive the cutting plane being on line 9—9 Figure 5 to line 9 Figure 6. Fig. 10 represents a plan section through the saddle of the milling machine to show the feed screw drive gears the cutting plane being on line 10—10 through Figure 6. Fig. 11 is a partial plan view of the two tables to show how both tables may be geared together. Fig. 12 represents an end view of the same. Fig. 13 represents a plan view of a table with a swivel top attached thereto. Fig. 14 represents a front sectional view of the same the cutting plane being on line 14—14 Figure 15. Fig. 15 represents an end sectional view of Fig. 13 the cutting plane being on line 15—15 Fig. 13. Fig. 16 is an enlarged view of the reversing mechanism shown in Fig. 9 to show more clearly the details of construction. Figure 17 is a side view of the same. Figure 18 is a view similar to Fig. 13 and in combination with Fig. 19 (plan view and end view respectively) shows an alternative construction for the mechanism shown by Figures 13, 14 and 15.

Similar characters designate like parts throughout the several views of the drawings. In the drawings 1 represents the supporting column upon which the various units of the machine are mounted, 2 represents a cone pulley which is attached to a spindle in which is mounted an arbor 3. This arbor carries the various cutters used for milling; this being the most common arrangement employed and with which operators are most generally familiar when doing horizontal milling; 4 represents a drive shaft to which revolving motion is imparted by means of a train of gears, driven by a chain 84 or belt from the drive cone 2; all of this being similar to that used in machines now on the market and with which operators are generally familiar; 5 and 6 represent the two tables which are novel to this invention; 7 known as a saddle is mounted on supporting knee 8 and carries the two tables; these two members 7 and 8 carry the driving means for operating the two tables; 9 is a hand wheel to operate table 6 by hand; 10 is a hand wheel to operate table 5 by hand; 11 is a hand wheel to operate both tables when the same are geared together thus being caused to work as one; 12 is a screw used for adjusting the tables in a vertical plane; 13 is a hand wheel which in combination with other parts is used for operating this screw, 14 is a hand wheel which in combination with other parts to be hereinafter described is used to move the tables crossways on member 8; tables 5 and 6 being made to travel longitudinally at right angles to the member 8.

Referring to Fig. 9 shaft 4 drives through a gear 66 into a gear 16; this in turn drives gear 17 shown in Fig. 6; this in turn drives gear 18 and shaft 20. When clutch 21 is engaged shaft 20 drives gear 22 which in turn operates gear 23 which revolves feed screw 12, thus causing knee 8 with the tables mounted thereon to move in a vertical plane. When clutch 24 is engaged gear 19 drives screw 25 which operates in nut 26 to move saddle 7 with the tables mounted thereon in or out crossways of knee 8. Gear 27 is attached to shaft 20 and revolves therewith. Gear 27 drives gear 28; this gear 28 is made with a beveled gear at its opposite end the portion between these two gears being cylindrical and revolves in a bearing 29 attached to saddle 7. This gear 28 also has a clearance hole in it so screw 25 will pass through it without touching therein. Gear 28 drives beveled gear 30 which is mounted on a stud 31 and drives gear 32. Gear 32 revolves gears 33 and 34 which in turn are attached to gears 35 and 36. The function of these last two beveled gears is to transmit movement to the beveled gears 37 and 38 shown in Fig. 8, these gears in turn transmit power to the two screws 39 and 40 which drive the respective tables. Gears 37 and 38 which are of the beveled type are made integral as part of sleeves which run in bearings, they being held therein by checknuts 41 and 42, at the opposite end is made a clutch 43 and 44, this gear with clutch revolves continuously while the machine is in motion. Clutches 45 and 46 are keyed to the shafts 39 and 40 which are turned straight at one end and are threaded at the other, said clutches being slidably mounted thereon. Sleeves 47 and 48 are provided to support these clutches and said shafts. When clutches 45 or 46 are engaged with clutches 43 or 44 attached to gears 37 or 38 shafts 39 or 40 revolve in nuts 49 or 50. These nuts being mounted in bearings on saddle 7, the revolving of these shafts in said nuts, which are stationary, cause the respective tables operated thereby to travel longitudinally, as the shafts are permanently attached to the table and carry the same with them slidably as the shafts are caused to screw in and out of the nuts. To control the movement of the tables, the clutches 45 and 46 are caused to disengage, these clutches may be operated at any position of the table with relation to the saddle 7 of the machine, either by hand or by stops which will throw out said clutches when said stops engage with control plungers.

Referring to Fig. 5 the control stops are 51 and 52. These are adjustable in the T slot and are clamped where required by bolt 53; similar stops are placed on the opposite side of the other table; these being clamped by bolts 54. These stops are caused to come in contact with plunger 55 for one table and 56 for the other. These plungers 55 and 56 transmit a rotary movement to control shafts in a manner which will be understood by referring to Fig. 7. To control the table nearest the operator plunger 55 has rack teeth cut into it; these mesh with pinion 57 and when 55 is pushed down by either stop 51 or 52 coming in contact with it shaft 58 is rotated, this oscillates yoke 59 which throws clutch 45 in Fig. 8 out of mesh with clutch 44 thus causing the screw 40 which operates the table to stop rotation, likewise pin 56 operates pinion 60 and revolves shaft 61 thus oscillating yoke 62 and throwing clutch 46 in Fig. 8 out of mesh with clutch 43 which is attached to gear 37, thereby stopping the rotation of screw 39 and thus stopping the feeding of table 6, to throw the clutches back in mesh to start the tables feeding longitudinally again levers 63 and 64 are revolved by the operator. Lever 63 is attached to shaft 58 at its outer end and causes the yoke 59 to throw the clutches back into mesh, likewise operating lever 64 rotates shaft 61 and this by operating through yoke 62 causes clutch 46 to be thrown back in mesh thereby starting the feeding of the respective table controlled thereby which in this instance is 6. To reverse the feed of the two tables or in fact to reverse the direction of rotation of all the driving members contained in the saddle 7 and knee 8 lever 65 shown in Figs. 9, 16 and 17 is used, lever 65 carries gear 66 and a slightly smaller gear 15 both of which are in mesh together, gear 66 also meshes with gear 17 (Fig. 6), lever 65 is pivotally suspended so that normally gear 66 is in mesh with a gear on driving shaft 4, thus in turn 66 drives gear 17 which causes the tables of the machine to be driven in one direction as previously described through the intermediate mechanism, at this time gear 15 is running idle and performing no work; now to reverse the direction of the table travel, 65 is moved so that gear 15 instead of gear 66 is in mesh with gear on shaft 4, thus at this time gear on shaft 4 drives gear 15 which in turn drives gear 66, and therefore said 66 drives gear 17; and it will be noted that in the first case the drive is transmitted through three gears while in the latter instance it is transmitted through four gears thereby reversing the direction of all mechanism operated by gear 17. This is a construction similar to that used for reversing the direction of feed screw travel on many lathes and is known as a "tumbler gear reverse." This method of reversing the direction of drive is common to most all milling machines of the knee type with which operators are generally familiar. Having now thoroughly described the fundamental means of operation of this improvement in milling machine construction this combination of units permits driving the two tables 5 and 6 in either direction longitudinally and separately as described thereby allowing the operator to have positive control of either table at all times. The next function desired in a machine of this kind is to arrange the two tables so they can be driven together positively as one and when so operated to be positively controlled as one. To this end means have been provided as shown in Figs. 11 and 12. On the ends of the two feed screws 39 and 40 have been mounted spur gears 67 and 68, these are keyed to the end of the screws. Connecting these two gears is gear 69, this is mounted on stud 70 as shown and is attached to hand wheel 11. This arrangement permits of operating the two tables together as one by hand, the operator turning the hand wheel 11 to accomplish this. In addition clutch operating levers 63 and 64 are attached together by a connecting link 72, this link being held to the levers by screws 71. This permits the operator of the machine to work the two screw driving clutches 45 and 46 as previously described in unison and the feed stops 51 and 52 coming in contact with pin 55 will cause the two clutches to be disengaged in unison through the same combination of parts used for controlling the tables independently. The improvements in milling machine construction so far described in detail deal with the operation of the longitudinally feed tables independently and in unison. In the description to follow novel features of revolvable table construction and inclined table arrangement are described all of which may be incorporated in one improved machine.

Referring to Figs. 13, 14 and 15, the arrangement shown is an attachment applicable to be detachably mounted on the tables of the milling machine or to be permanently arranged as a table of the milling machine. This is a revolvable plate 73 which is held to the sliding table of the machine by stud 74, this stud has a pin 75 through its lower end to hold the stud in place. With said stud 74 as an axis the plate 73 can be revolved. 76 is a locating pin while 77 and 78 are clamps, these are tightened by screws having handles 79. The particular advantage of this attachment is to further increase the possibilities of production milling, additional to the double table machine or it is likewise applicable to a single table machine. In using this an operator loads work on one side of the plate as indicated by the line with arrow heads 80 while the other side 81 with work in place is passing under the milling cutters. At the completion of the cut the table with plate on is slidably brought back to the starting point in the usual manner, the operator loosens the clamps 77 and 78 by means of levers 79, he then revolves the swivel plate 73 until pin 76 enters the bushing at 82 and tightens the clamps 77 and 78 following which the sliding table is fed under the cutters while he removes work just finished and loads the inoperative side of the table and repeats. There are two holes 82 in this construction and the swivel plate 73 is set on an angle to facilitate loading the inoperative side of the same while the working side is passing in a level plane under the cutters. Broadly applied this arrangement would be designed to suit the particular machine incorporated in or attached to, with due regard to the work being handled; if four pieces were being machined it would be necessary to stop the revolvable member at four positions about the stud 74 or likewise it could be stopped and clamped at an indefinite number of stations. In this event the arrangement would be designed without the angular surfaces and as shown by Figures 18 and 19, thus four pieces of work at successive stations could be machined or any two pieces of work diametrically opposite could be machined by using two groups of cutters on the arbor or spindle of the machine. The drawings Figs. 18 and 19 show two pieces being milled by cutters C while work is put in position at D. This plate 73 when normally part of the machine previously described as a whole would lie flat and be attached to the inner table and would rest on the table nearest the operator which would give it additional support. When it is desirable to attach this to any of the common single table machines now on the market it would be necessary if the entire capacity of the machine was utilized to have portion 83 overhang the table of the machine and it could be set in a so called flat plane or on an angle as shown; the particular construction employed being that particularly applicable to the machine upon which employed.

By referring to Fig. 3 it will be noticed that all parts except 1 below 3 are set on an angle with relation to the base as indicated at Y, this is obtained by casting guides 84 and 85 on the base 1 to suit this angle. The advantage of this angular arrangement is that the feeding table of the machine is counterbalanced to resist the strains of the cutters set up by milling the work, because the weight of the tables in this tilted position must be pulled upwards when being fed and not merely be slid along as is customary. This also facilitates putting the work on the table as one end of the table is lower than is generally the case when the usual type of horizontal table is employed. This feature of the invention while paramountly considered as an improvement in this double table milling machine construction is to be here considered as an improvement which may be used to supplant the horizontal arrangement as shown in the previous views as found desirable. This angular arrangement is also applicable as an improvement to single table milling machines now on the market and with which operators are generally familiar.

It is believed that the operation and many advantages of the invention will be thoroughly understood from the foregoing and while it is preferred to employ the specific construction and arrangement of the parts shown and described it will be understood that this construction and arrangement is not essential to the broader features of the invention and may be varied or modified within the scope of the appended claims as found desirable or best suited to the construction of the machine in which the invention is to be embodied.

Having thus explained the nature of my invention, I claim;—

1. A milling machine having the combination of a crossways adjustable saddle; two tables slidably mounted thereon, feed screws driven by shafts through the medium of gears and clutches to operate slidably said tables independently or in unison, table stops in combination with feed control members to start or stop said tables at any position of their travel independently or in unison.

2. In a machine of the class described the combination of a base 1, a knee 8 slidably mounted thereon; a screw 12 to operate said knee; a saddle 7 slidably mounted on said knee to support a plurality of tables in working relation with a cutter spindle; a screw 25 operated by gears through the medium of shafts, clutches, levers and connecting parts, to operate said saddle 7 on said knee; tables slidably mounted on said saddle to hold work for milling; table operating screws 39 and 40, arranged to be driven by gears attached to clutches 43 and 44, clutch operating levers and feed control mechanism all substantially as shown, a cutter drive spindle 3, drive pulleys 2, a feed driving chain and a train of gears; reverse gears 15 and 66, drive shafts to transmit motion to the slidable tables and knee members, knee supporting guides attached to said base 1 on which knee 8 is slidably mounted to cause operation of table or tables in an angular plane with relation to said base, an indexing swivel plate revolvably mounted on one of said slidable tables; and means to locate said plate on said table in different positions around a stud.

3. In a machine of the class described a combination of multiple tables mounted so they are free to slide independently of each other and so they can with equal convenience be driven attachedly together by means of co-acting drive units combinedly controlled, a base to support said tables; means to manually slide said tables consisting in part of a handwheel; power means to slide said tables through the medium of driving connections to the source of power; control mechanism to stop the sliding of said tables at predetermined locations.

4. In a machine of the class described, in combination two sets of cutters, one set being mounted over each of two tables, slidably mounted on non-rotary supporting members so they may be simultaneously caused to operate at one and the same time; operating means to move said tables by hand consisting in part of a handwheel; a screw revolvably mounted in a nut; and means to operate said mechanism automatically.

5. In a machine of the class described the combination of a work cutting tool and means to rotate it; multiple tables, slidably mounted on supporting members so they operate longitudinally in advance of each other at the same time; means to operate to perform work on said tables singly or in unison, automatically or by hand; means to limit the operation of said tables, automatically or by hand; means to adjust said tables crossways; means to adjust said tables vertically.

6. A machine having in combination; two slidably mounted tables, supporting members for said tables, means to hold and guide said tables non-revolvable and consisting in part of a saddle adjustably arranged with control mechanism mounted in same and adjustably mounted on a base; all arranged to substantially perform the functions described.

7. In a machine of the class described, the combination of two tables slidably mounted on a saddle, driving means to operate said tables back and forth consisting in part of screws 39 and 40 made in part as shafts and revolvable as one, nuts, 49 and 50 (in which said screws operate) affixably mounted in bearing, means to operate said screws by hand, clutches 43 and 44 consisting in part of sleeves with gears of the beveled type mounted thereto, said clutches being mounted in bearings attached to said saddle, clutches 45 and 46 with operating yokes 59 and 62 slidably attached thereto, said clutches being keyed to shaft portions of said screws 39 and 40, supporting bearings for said shafts and said clutches; tripping blocks 51 and 52, plungers 55 and 56 consisting in part of racks which engage with pinions 57 and 60 attached to rocker shafts, said shafts being connected with levers 63 and 64, means to manually and automatically control the feed of said tables; tilted slides, means to cause tables to feed at an angle; train of gears 67, 68 and 69 in connection with hand wheel and shaft, means to operate said tables together, said tables being normally operated independently; plate 73 with center stud revolvable by hand on said tables to locate work at different stations; locating pin 76, bushings, and clamps, means to control the location of said plate on said tables; saddle 7, knee 8, train of gears, screws 12 and 25, beveled gears, to transmit movement to said tables; spindle 3, drive pulley 2, feed drive connecting chain, gears, knuckle shaft 4 and connections to transmit movement from spindle to cutters and from spindle to table feed members.

8. A machine having in combination two tables slidably mounted on a saddle, driving means to operate said tables longitudinally consisting in part of screws with shafts 39 and 40 revolvable as one, nuts 49 and 50 (in which said screws operate) fixably mounted in bearing, handwheel to operate said screws by hand, clutches 43 and 44 consisting in part of sleeves with gears attached thereto, said clutches being mounted in bosses attached to said saddle, clutches 45 and 46 with operating levers 59 and 62 slidably attached thereto, said clutches being slidably fixed to shaft portions of said screws 39 and 40; supporting means for said shaft and said clutches; means to operate sliding clutches to control feed; means to cause said tables to feed at an angle to a base; train of gears 67, 68 and 69, connecting link 72 for table trip levers to operate said tables together, said tables being normally operated independently; plate 73 with center stud revolvable manually on said tables; locating pin 76, bushings and clamps, to control the location of said plate on said table; saddle 7, knee 8, train of gears, screws 12 and 25, beveled gears, to transmit movement to said tables; spindle 3, drive pulley 2, feed drive connecting chain gears, shaft 4 and connections to transmit movement from spindle which drives cutters to table feed.

9. In a machine of the class described, the combination of a saddle and a table thereon; a revolvable plate mounted thereon and consisting in part of a centralizing stud and a locating pin, in connection with locating holes; and clamping means to retain said plate in position all slidably attached to said saddle.

10. In a machine of the class described, the combination of a cutter spindle, a saddle, and a table; a revolvable plate mounted thereon and consisting in part of a centralizing stud and a member for locating said revolvable plate angularly on the table in connection with locating holes; clamping means to retain said plate in position all slidably attached to said saddle, adjusting screws, and a knee on which said saddle is adjustably mounted with power transmitting members means to hold said plate in working relation with said cutter spindle.

11. In a machine of the class described, the combination of a cutter spindle and tables slidably mounted; operating means for said tables; a saddle to support said operating tables, a base consisting in part of means to hold said members at an acute angle to the base, and operating members for said tables means to cause the same to move in operative relation with said cutter spindle.

12. In a machine of the class described, the combination of a saddle and a table; a revolvable plate mounted thereon and consisting in part of a centralizing stud and a locating pin, in connection with multiple locating holes; clamping means to retain said plate in position all slidably attached to said saddle; and angular surface means to cause said revolvable plate to have a horizontal cutting plane and angular loading plane.

13. In a milling machine, the combination of a cutter spindle, multiple work tables capable of performing the same function at the same time, a common support for the work tables movable with reference to said spindle to place the work tables individually or combinedly in working relation with the cutter spindle.

14. In a milling machine, the combination of a cutter spindle, two work tables, means for manually operating said tables so they may be caused to function together, a support for the work tables to hold said tables side by side to place the same individually in working relation with the cutter spindle.

15. In a milling machine, the combination of a cutter spindle, multiple work tables means to operate manually said tables, a common support for the work tables means to place said tables in working relation with the cutter spindle individually or in combination.

16. In a milling machine, the combination of a cutter spindle, a plurality of work tables operatable simultaneously in the same direction, an adjustable support for the work tables to place said tables in position so they will function in like manner when in working relation with the cutting tool spindle.

17. In a milling machine, the combination of a cutter spindle, a plurality of work supporting tables adapted to be simultaneously brought into operative relation with the cutter spindle, a support for the work tables means to place said tables in working relation with the cutting tool spindle; a saddle; means to adjust said tables transversely of said cutting tool spindle.

18. In a milling machine, the combination of a cutter spindle, a plurality of work supporting tables adapted to be simultaneously brought into operative relation with the cutter spindle, a support for said work tables, means to place said tables without the necessity of revolving for loading purposes in working relation with the cutting tool spindle, a knee means to adjust said table vertically of said cutting tool spindle.

19. In a milling machine the combination of a cutter spindle, a plurality of work tables adapted to be simultaneously brought into operative relation with said cutter spindle, a support for the work tables, a feed mechanism responsive to manual operation for each work table.

20. In a milling machine the combination of a cutter spindle, multiple work tables capable of being operated at once, a support for said work tables consisting in part of adjusting members to place said tables in simultaneous working relation with the cutter spindle; a feed mechanism for each of said work tables, and means to control each feed mechanism independent of the other.

21. In a milling machine the combination of a cutter spindle, multiple work tables adapted to be simultaneously brought into operative relation with said cutter spindle; a support for said tables; adjusting members to place said tables in working relation with the cutter spindle; a feed mechanism for each of said work tables that is responsive to manual operation, and means to control each feed mechanism independent of the other; a work table feed connecting mechanism; means to control the multiple tables combinedly.

22. In a milling machine the combination of a cutter spindle, multiple work tables, a support for said work tables consisting in part of adjusting members to place said tables in working relation with the cutter spindle at one and the same time at different positions; a feed mechanism for each of said work tables, and means to control each feed mechanism independently of each other or combinedly; a driving pulley, gearing between the latter and the table feed means to transmit feeding movements.

23. The combination with a tool, of a table and a workholding plate revolvably mounted on said table, said plate being provided with two work supporting portions, either of which portions may be brought into operative position with relatiton to said tool while the other portion is out of such relation in position to be loaded, said plate being arranged so it may be removed from said table to permit of the table being used for holding work not adapted to rotation.

24. In a machine tool, the combination of a table; a revolvable plate to permit of loading work at some points while operating on work mounted at other points, said revolvable plate being detachably mounted to permit of removal while work not adaptable to its use is machined on said table; clamping members for said plate; means to locate said plate when revolved from point to point.

25. In a machine of the class described multiple tables responsive to manual operation and adapted to be simultaneously brought into operative relation with a cutter spindle; revoluble cutter spindle; means to support said tables consisting in part of a base; means to drive said tables into working contact with said cutter spindle.

26. In an indexing arrangement the combination of a cutting tool; a revolvable plate to form a horizontal surface on which work to be machined is held and an inclined surface for loading work, a base plate to support said revolvable plate in proper working relation to said cutting tool.

FRANK H. MAYOH.

Witnesses:
WILLIAM A. FERGUSON,
WENDELL T. INGHAM.